U S007690022B2

(12) United States Patent
Basawapatna et al.

(10) Patent No.: US 7,690,022 B2
(45) Date of Patent: Mar. 30, 2010

(54) VIDEO DISTRIBUTION SYSTEM FOR DIGITAL AND ANALOG SUBSCRIBERS

(76) Inventors: Ganesh Basawapatna, 5157 S. Boston St., Greenwood Village, CO (US) 80011; Varalakshmi Basawapatna, 5157 S. Boston St., Greenwood Village, CO (US) 80011

( * ) Notice: Subject to any disclaimer, the term of this patent is extended or adjusted under 35 U.S.C. 154(b) by 0 days.

(21) Appl. No.: 10/675,415

(22) Filed: Sep. 30, 2003

(65) Prior Publication Data

US 2004/0068751 A1    Apr. 8, 2004

Related U.S. Application Data

(60) Provisional application No. 60/415,599, filed on Oct. 2, 2002.

(51) Int. Cl.
*H04N 7/16* (2006.01)
(52) U.S. Cl. ............... 725/127; 725/118; 725/119; 725/120; 725/126; 725/131; 725/78; 725/83; 725/139
(58) Field of Classification Search ............... 725/120, 725/118, 119, 126, 127, 131, 78, 83, 139, 725/151
See application file for complete search history.

(56) References Cited

U.S. PATENT DOCUMENTS

| 3,639,840 | A | * | 2/1972 | Shekel et al. | ............ | 725/151 |
| 3,889,050 | A | | 6/1975 | Thompson | ............ | 178/5.1 |
| 3,935,534 | A | | 1/1976 | Lewis et al. | | |
| 3,990,012 | A | | 11/1976 | Karnes | ............ | 325/308 |

(Continued)

FOREIGN PATENT DOCUMENTS

EP    0419137 A2    3/1991

(Continued)

OTHER PUBLICATIONS

Nortel Networks, "Nortel Networks Cable Modem Termination System 1000," Nov. 1998, pp. 1-6 (available at http://www.mercury.com.ar/pdf/nortel/CMTS%201000%20Datasheet.pdf).*

(Continued)

*Primary Examiner*—Jason P Salce
(74) *Attorney, Agent, or Firm*—Schawbe, Williamson & Wyatt, P.C.

(57) ABSTRACT

A cable distribution system with distributed architecture that can accommodate both digital and analog subscribers. Each home has at least one Room Interface Unit (RIU), one for each television. There is a local service module associated with a group of RIUs (e.g., one for every ten RIUs). There is also a local headend in the vicinity. The local headend has a block of integrated tuner/receiver/decoders that can be controlled to tune in a selected video channel. The selected video channels and a group of standard channels are multiplexed and sent to the local service modules where a group of programmable converters (one for each RIU) place the channel selected by its corresponding RIU at a predetermined frequency. Each of the RIUs associated with a particular local service module receive the corresponding channel. Depending upon whether the subscriber has subscribed to digital or analog service, they will have either a digital or an analog RIU. The analog RIU may include a bandpass filter while the digital RIU may include one or more IRDs. Forward and return DOCSIS channels are also provided.

38 Claims, 6 Drawing Sheets

U.S. PATENT DOCUMENTS

| | | | | |
|---|---|---|---|---|
| 4,135,157 | A | * | 1/1979 | den Toonder ............... 725/120 |
| 4,331,974 | A | | 5/1982 | Cogswell et al. .............. 358/86 |
| 4,475,123 | A | | 10/1984 | Dumbauld et al. .......... 358/114 |
| 4,823,386 | A | | 4/1989 | Dumbauld et al. ............ 380/13 |
| 4,829,560 | A | | 5/1989 | Evanyk et al. ............... 379/106 |
| 4,901,367 | A | | 2/1990 | Nicholson ...................... 455/5 |
| 5,155,590 | A | | 10/1992 | Beyers, II et al. ............. 358/86 |
| 5,220,420 | A | * | 6/1993 | Hoarty et al. ................ 725/119 |
| 5,243,647 | A | | 9/1993 | Parikh et al. .................... 380/4 |
| 5,247,347 | A | | 9/1993 | Litteral et al. ................. 358/85 |
| 5,273,043 | A | | 12/1993 | Ruike ......................... 128/659 |
| 5,382,260 | A | | 1/1995 | Dormandy, Jr. et al. ..... 606/151 |
| 5,382,971 | A | | 1/1995 | Chanteau ....................... 348/6 |
| 5,408,260 | A | | 4/1995 | Arnon ........................... 348/6 |
| 5,481,757 | A | | 1/1996 | Mihara et al. ................ 455/3.1 |
| 5,495,483 | A | | 2/1996 | Grube et al. ............... 370/95.1 |
| 5,504,816 | A | | 4/1996 | Hamilton et al. | |
| 5,521,906 | A | | 5/1996 | Grube et al. ................... 370/17 |
| 5,600,364 | A | | 2/1997 | Hendricks et al. | |
| 5,604,528 | A | | 2/1997 | Edwards et al. .............. 348/5.5 |
| 5,613,190 | A | | 3/1997 | Hylton ....................... 455/3.1 |
| 5,631,693 | A | * | 5/1997 | Wunderlich et al. ........... 725/91 |
| 5,646,688 | A | | 7/1997 | Hashimoto .................. 348/402 |
| 5,682,195 | A | | 10/1997 | Hendricks ...................... 348/6 |
| 5,699,105 | A | * | 12/1997 | Chen et al. .................. 725/120 |
| 5,719,872 | A | | 2/1998 | Dubberly et al. ............ 370/487 |
| 5,721,829 | A | * | 2/1998 | Dunn et al. .................... 725/87 |
| 5,729,281 | A | * | 3/1998 | Utsumi et al. ............... 725/119 |
| 5,740,075 | A | * | 4/1998 | Bigham et al. .............. 709/229 |
| 5,760,822 | A | | 6/1998 | Coutinho et al. | |
| 5,774,527 | A | | 6/1998 | Handelman et al. ...... 379/93.07 |
| 5,790,176 | A | | 8/1998 | Craig ........................... 348/13 |
| 5,790,806 | A | | 8/1998 | Koperda ............... 395/200.82 |
| 5,812,928 | A | | 9/1998 | Watson, Jr. et al. .......... 455/5.1 |
| 5,812,929 | A | | 9/1998 | Tsutsui et al. ................ 455/5.1 |
| 5,818,511 | A | | 10/1998 | Farry et al. ..................... 348/7 |
| 5,828,403 | A | * | 10/1998 | DeRodeff et al. ............ 725/131 |
| 5,847,660 | A | | 12/1998 | Williams et al. ....... 340/825.03 |
| 5,847,751 | A | | 12/1998 | Safadi ........................... 348/7 |
| 5,899,983 | A | | 5/1999 | Hussmann ................... 705/44 |
| 5,905,941 | A | | 5/1999 | Chanteau ..................... 455/3.2 |
| 5,917,537 | A | | 6/1999 | Lightfoot et al. ............... 348/3 |
| 5,917,830 | A | | 6/1999 | Chen et al. .................. 370/487 |
| 5,966,636 | A | | 10/1999 | Corrigan et al. .............. 455/4.2 |
| 5,970,386 | A | * | 10/1999 | Williams ...................... 725/69 |
| 6,009,465 | A | * | 12/1999 | Decker et al. .................. 725/82 |
| 6,021,341 | A | | 2/2000 | Scibilia et al. .............. 600/407 |
| 6,057,872 | A | | 5/2000 | Candelore ..................... 348/3 |
| 6,118,976 | A | | 9/2000 | Arias et al. .................. 455/5.1 |
| 6,188,871 | B1 | * | 2/2001 | Kitamura et al. ............ 725/120 |
| 6,192,399 | B1 | | 2/2001 | Goodman | |
| 6,243,446 | B1 | | 6/2001 | Goodman ............... 379/93.01 |
| 6,263,503 | B1 | * | 7/2001 | Margulis ..................... 725/81 |
| 6,286,142 | B1 | * | 9/2001 | Ehreth ......................... 725/78 |
| 6,305,021 | B1 | * | 10/2001 | Kim ........................... 725/131 |
| 6,317,885 | B1 | * | 11/2001 | Fries .......................... 725/109 |
| 6,481,013 | B1 | * | 11/2002 | Dinwiddie et al. ............ 725/80 |
| 6,519,773 | B1 | * | 2/2003 | Ahmed et al. ............... 725/118 |
| 6,598,231 | B1 | | 7/2003 | Basawapatna et al. ...... 725/120 |
| 6,622,307 | B1 | * | 9/2003 | Ho ............................. 725/120 |
| 6,728,965 | B1 | | 4/2004 | Mao | |
| 6,738,983 | B1 | * | 5/2004 | Rao et al. ................... 725/120 |
| 6,745,392 | B1 | | 6/2004 | Basawapatna et al. ...... 725/120 |
| 6,848,116 | B1 | | 1/2005 | Land | |
| 6,889,385 | B1 | * | 5/2005 | Rakib et al. ................. 725/119 |
| 7,007,297 | B1 | * | 2/2006 | Woodward .................. 725/129 |
| 7,036,140 | B2 | * | 4/2006 | Terry et al. ................. 725/120 |
| 7,146,628 | B1 | | 12/2006 | Gordon et al. | |
| 7,200,855 | B2 | * | 4/2007 | Laksono ...................... 725/82 |
| 7,260,825 | B2 | * | 8/2007 | Ansari et al. .................. 725/82 |
| 2002/0019984 | A1 | * | 2/2002 | Rakib ......................... 725/111 |
| 2002/0031224 | A1 | | 3/2002 | Basawapatna et al. ...... 380/211 |
| 2002/0056140 | A1 | * | 5/2002 | Oishi et al. ................. 725/148 |
| 2002/0073431 | A1 | * | 6/2002 | Nikolich ..................... 725/111 |
| 2002/0091866 | A1 | | 7/2002 | Perlman | |
| 2003/0018745 | A1 | * | 1/2003 | McGowan et al. .......... 709/217 |

FOREIGN PATENT DOCUMENTS

| | | |
|---|---|---|
| EP | 1063801 A2 | 12/2000 |
| WO | 199311617 A | 6/1993 |

OTHER PUBLICATIONS

Fellows, et al., "DOCSIS Cable Modem Technology," IEEE Communications Magazine, Mar. 2001, vol. 39, Issue 3, pp. 202-209 (ISSN: 0163-6804).*
Office Action of U.S. Appl. No. 10/666,646 mailed Jan. 5, 2009.
Office Action of U.S. Appl. No. 10/666,646 mailed Jul. 24, 2008.
Office Action of U.S. Appl. No. 10/666,646 mailed Feb. 6, 2008.
Office Action of U.S. Appl. No. 10/666,646 mailed Aug. 9, 2007.
International Search Report of WO Application No. PCT/US2003/29851 dated Jan. 4, 2004.
Supplemental European Search Report of EP Application No. 3754830.2 dated Feb. 2, 2007.
International Search Report, mailed Dec. 9, 2004 for application PCT/US03/30908.
Office Action for U.S. Appl. No. 10/666,646 mailed Jun. 8, 2009.
Written Opinion for PCT App. No. PCT/US03/29851 mailed May 8, 2007.
Written Opinion for PCT App. No. PCT/US03/30908 mailed Mar. 30, 2005.
Supplementary European Search Report for EP App. No. 3776206.9 mailed Apr. 5, 2006.
International Preliminary Examination Report for PCT App. No. PCT/US03/30908 mailed Mar. 3, 2006.
Final Office Action for U.S. Appl. No. 10/666,646 received Dec. 17, 2009.

* cited by examiner

Key System Elements: Room Interface Unit (RIU), Local Server Module (LSM), Integrated Headend Module, and Customer Management System (CMS)

Cost reduction is achieved by RF Distribution Architecture and Resource Sharing

VIDEO DISTRIBUTION SYSTEM FOR DIGITAL AND ANALOG SUBSCRIBERS

CROSS-REFERENCE TO RELATED APPLICATIONS

This application claims priority from U.S. Provisional Patent Application No. 60/415,599 filed Oct. 2, 2002, entitled "Video Distribution System for Digital and Analog Subscribers", the contents of which are incorporated herein by reference.

FIELD OF THE INVENTION

This present invention relates generally to video distribution systems, and more particularly to those intended for servicing both digital and analog subscribers.

BACKGROUND OF THE INVENTION

Historically, cable television distribution systems once utilized analog video channels at all points in the network. For a variety of reasons discussed below, the industry has been migrating toward a digital distribution system for the past decade or so. This migration to digital programming, a digital network, and digital televisions is often referred to as the "digital rollout." Some of the motivating factors behind the digital rollout include improved picture quality, more efficient use of bandwidth (the ability to provide more channels and services), increased ability to prevent cable piracy, potentially less costly components, potentially higher profit margins, and governmental requirements. One important practical requirement that appears to be universally recognized by all parts of the industry is that the digital rollout should not affect the service to the 70-90% of cable customers who have not yet converted to a digital set-top box (STB). Accordingly, most, if not all, cable television distribution systems place the analog channels at relatively lower frequencies and digital channels are multiplexed together at relatively higher frequencies. In this manner, analog-only customers can access their analog channels, while digital customers can access the digital channels located at the relatively higher frequencies, if they have the required hardware and if they are authorized subscribers.

The current status of the digital rollout varies greatly from country to country, region to region, and community to community. Within the United States, much of the equipment at the headend in most cable systems has already been made digital compatible. However, at the opposite end of the network, at the customer's home, a complex digital set-top box (STB) is required. Currently, it is estimated that between 10-15% of cable customers may have this digital service. Unfortunately, most set-top box manufacturers release new STB products every couple years, so it is difficult for customers and cable companies to keep up with the latest STB technology and features. Furthermore, a key component of a cable television distribution network in prior art systems has been the cable line from a node of the distribution system out to the customer's house. While some communities have had their "last mile" of cabling upgraded to higher quality coaxial cable, having a bandwidth of 750 MHz, many countries and communities have coaxial cabling with a bandwidth of only 350 MHz, particularly rural communities. As can be appreciated, in communities with lower bandwidth cabling, the cable companies have limited options with regard to adding digital channels without deleting analog channels.

Typically, STBs include circuitry to convert the analog and/or digital signals received from the cable or satellite system into a signal suitable for analog television sets. In addition, there is typically circuitry to allow the customer to select the desired channel and thus control which received video channel is converted to the frequency for the television. STBs have also come to include circuitry that is addressable from upstream in the video distribution system so that the STB can be commanded to enable or disable the selection of certain individual channels, such as may be desired for pay channels such as HBO, and so forth. More recent systems with digital STBs allow one or more functions such as Interactive Program Guide, Video On Demand, Interactive Television, and Interactive Games to be played on the television set.

Largely because of the complex circuitry described above, STBs may cost in the range of two hundred dollars for the equipment alone. In addition, it is typically required that the cable or video distribution company send a person to the customer's house to install the STB. Furthermore, additional visits by company technicians may be required when the customer changes the level of service, when upgrades are made to the equipment or software, and when a customer terminates service. Unfortunately for the video distribution companies (such as cable or Direct to Home (DTH) satellite distribution companies), the expense of STBs, for both the box itself and the labor to install/maintain, is a very significant cost to the companies and one they have difficulty charging directly to the customer. Because of the competition from entertainment service providers with DSL, satellite, and Internet delivery, cable companies are hesitant to charge for these expenses since they are constantly trying to attract new customers and retain current customers. All of this is further exacerbated by the fact that new models of digital STBs are released every year or two and a portion of customers with older models become frustrated that they do not have all of the services available to other customers.

In apartment buildings, the problem is worse since the average annual turnover of tenants in apartments nationwide averages between 30-60%. Thus, there are many more customer site visits for installation, service changing, and termination of service. To make matters even worse, it is estimated that up to 30% of the times an apartment dweller moves from the premises, the STB leaves with them.

All in all, the digital rollout in the cable industry is hampered in part by the high cost of installing high bandwidth cabling to the customer's home and by the cost of supplying and maintaining STBs. It is against this background and with a desire to improve on the prior art that the present invention has been developed.

SUMMARY OF THE INVENTION

In view of the foregoing, a broad objective of the present invention is to decrease costs associated with providing analog and digital services to a customer base that includes both analog and digital customers, while steadily increasing the proportion of the customers who are digital. Another objective is to provide an analog and digital video distribution system that is sufficiently flexible to be easily upgradeable as new technologies come along. A further objective is to increase revenues for cable operators by providing analog customers additional services and motivating analog customers to switch to digital services. Another objective is to make it easy for cable companies to provide high speed data in bandwidth limited systems.

One aspect of the present invention is a cable distribution system that includes a headend receptive of signals from a plurality of video sources, the headend including a plurality of tuner/receiver/decoders that are each controllable to tune/receive/decode a selected video channel and provide the video channel at a selected frequency, wherein certain ones of the video channels contain analog video and audio signals and certain other ones of the video channels contain a plurality of digital video and audio signals multiplexed together to create a digital multiplex, selected ones of the plurality of video channels being multiplexed together by the headend to create one or more multiplexed channel signals. The system also includes a plurality of service modules associated with the headend, each service module receiving one or more of the multiplexed channel signals from the headend and providing it to each of a plurality of frequency converters within each service module that each convert one of the video channels to a predetermined frequency. The system further includes a plurality of interface units associated with each service module, there being one interface unit for each frequency converter of the service module, each interface unit being located at a customer location, each interface unit receptive of one of the video channels converted to the predetermined frequency, the interface unit passing a video and an audio signal in the video channel to a video displaying apparatus. Certain ones of the interface units can receive and decode both video channels containing a digital multiplex and video channels containing analog video and audio signals. Certain other ones of the interface units can receive and pass to the video displaying apparatus video channels containing analog video and audio signals, but cannot decode and pass to the video displaying apparatus video channels containing a digital multiplex.

The system may further include cabling running between each service module and the plurality of interface units associated therewith, the cabling being bandwidth limited so as to not efficiently carry signals appreciably above 350 MHz. The cabling may be metallic coaxial cabling. The system may further include cabling running between the headend and each of the plurality of service modules associated therewith, the cabling having sufficient bandwidth capacity to be able to efficiently carry signals at least as high as 750 MHz.

The headend may also include a block of Personal Video Recorders. The headend may also include a Video On Demand Server. The headend may also include a Personal Computer. The headend may also include a DOCSIS frequency converter. A DOCSIS forward channel being carried from an Internet service provider to a customer may be converted by the DOCSIS frequency converter to a different frequency for passage to the plurality of service modules and associated interface units.

Each of the frequency converters in each of the plurality of service modules may be a programmable converter. The system may further include a different bandpass filter associated with each frequency converter. Each interface unit may not include a microprocessor. Each service module may utilize the same predetermined frequencies as each other service module.

Each tuner/receiver/decoder may tune, receive, and decode a given video channel and that channel from that tuner/receiver/decoder can be displayed on every video displaying apparatus associated with that headend. The interface unit may pass information back upstream to its associated service module that includes channel selection information. The information passed back upstream to the service module may also include a DOCSIS return channel that is passed by the service module back to the headend and back to an Internet service provider. The system may further include a processor and associated database in communication with the headend and the service module, the processor being functional to control the operation of the receiver/decoders and the database assisting the microprocessor in this functionality and in storing customer viewing preferences. The local service module may only convert a selected video channel to the predetermined output frequency associated with a particular interface unit if that interface unit is authorized to receive that selected video channel.

The headend may include a cable mode transmission system (CMTS). The system may further include cabling running between each service module and the plurality of interface units associated therewith, the cabling having a home run architecture. The system may further include cabling running between each service module and the plurality of interface units associated therewith, the cabling having a loop through architecture. The system may further include cabling running between each service module and the plurality of interface units associated therewith, the cabling having a tree and branch architecture.

One or more of the video channels may include MPEG-4 encoded information. The headend may be a local headend. The system may further include a regional headend located at a location remote from the local headend, the regional headend providing video channels at selected frequencies to the local headend.

Another aspect of the invention relates to a cable distribution system that includes a headend receptive of signals from a plurality of video sources, the headend including a plurality of tuner/receiver/decoders that are each controllable to tune/receive/decode a selected video channel and provide the video channel at a selected frequency, wherein certain ones of the video channels contain analog video and audio signals and certain other ones of the video channels contain a plurality of digital video and audio signals multiplexed together to create a digital multiplex, selected ones of the plurality of video channels being multiplexed together by the headend to create one or more multiplexed channel signals. The system also includes a plurality of service modules associated with the headend, each service module receiving one or more of the multiplexed channel signals from the headend and providing it to each of a plurality of frequency converters within each service module that each convert one of the video channels to a predetermined frequency. The system further includes a plurality of interface units associated with each service module, there being one interface unit for each frequency converter of the service module, each interface unit being located at a customer location, each interface unit receptive of one of the video channels converted to the predetermined frequency, the interface unit passing a video and an audio signal in the video channel to a video displaying apparatus.

There may be at least two different configurations of interface units, one type provided to customers that are authorized to receive digital audio and video signals and one type provided to customers that are not authorized to receive digital audio and video signals. The video channels may have been spectrally inverted prior to passage to the interface unit. The interface unit may spectrally invert the received video channel to restore the original audio and video signal orientation before sending it to the set-top box. The at least one interface unit may include a high side LO frequency converter. The spectral inversion may be performed at the headend. The spectral inversion may be performed at the service module.

Another aspect of the present invention relates to a cable distribution system including a headend receptive of signals from a plurality of video sources, the headend including a plurality of tuner/receiver/decoders that are each controllable to tune/receive/decode a selected video channel and provide the video channel at a selected frequency, wherein certain ones of the video channels contain analog video and audio signals and certain other ones of the video channels contain a plurality of digital video and audio signals multiplexed together to create a digital multiplex, selected ones of the plurality of video channels being multiplexed together by the headend to create one or more multiplexed channel signals. The system also includes a plurality of service modules associated with the headend, each service module receiving one or more of the multiplexed channel signals from the headend and providing it to each of a plurality of frequency converters within each service module that each convert one of the video channels to a predetermined frequency. Further, the system includes a plurality of interface units associated with each service module, there being one interface unit for each frequency converter of the service module, each interface unit being located at a customer location, each interface unit having a frequency converter that converts the frequency of the video channel received from the service module. Even further, the system includes a set-top box associated with at least one of the interface units, the set-top box being receptive of the video channel from the interface unit, the set-top box passing a video and an audio signal in the video channel to a video displaying apparatus.

Numerous additional features and advantages of the present invention will become apparent to those skilled in the art upon consideration of the further description that follows.

DETAILED DESCRIPTION OF THE PREFERRED EMBODIMENT

Reference will now be made to the accompanying drawings, which assist in illustrating the various pertinent features of the present invention. Although the present invention will now be described primarily in conjunction with cable video distribution systems in single family homes, it should be expressly understood that the present invention may be applicable to other applications where it is desired to move more of the circuitry upstream in the video distribution system, thus simplifying the set-top box and decreasing the number of channels required to be sent to the customer's home, whether such home is an apartment, a hotel room, or a single family home. In this regard, the following description of a video distribution system is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain best modes known of practicing the invention and to enable others skilled in the art to utilize the invention in such, or other embodiments and with various modifications required by the particular application(s) or use(s) of the present invention.

Figure 1:
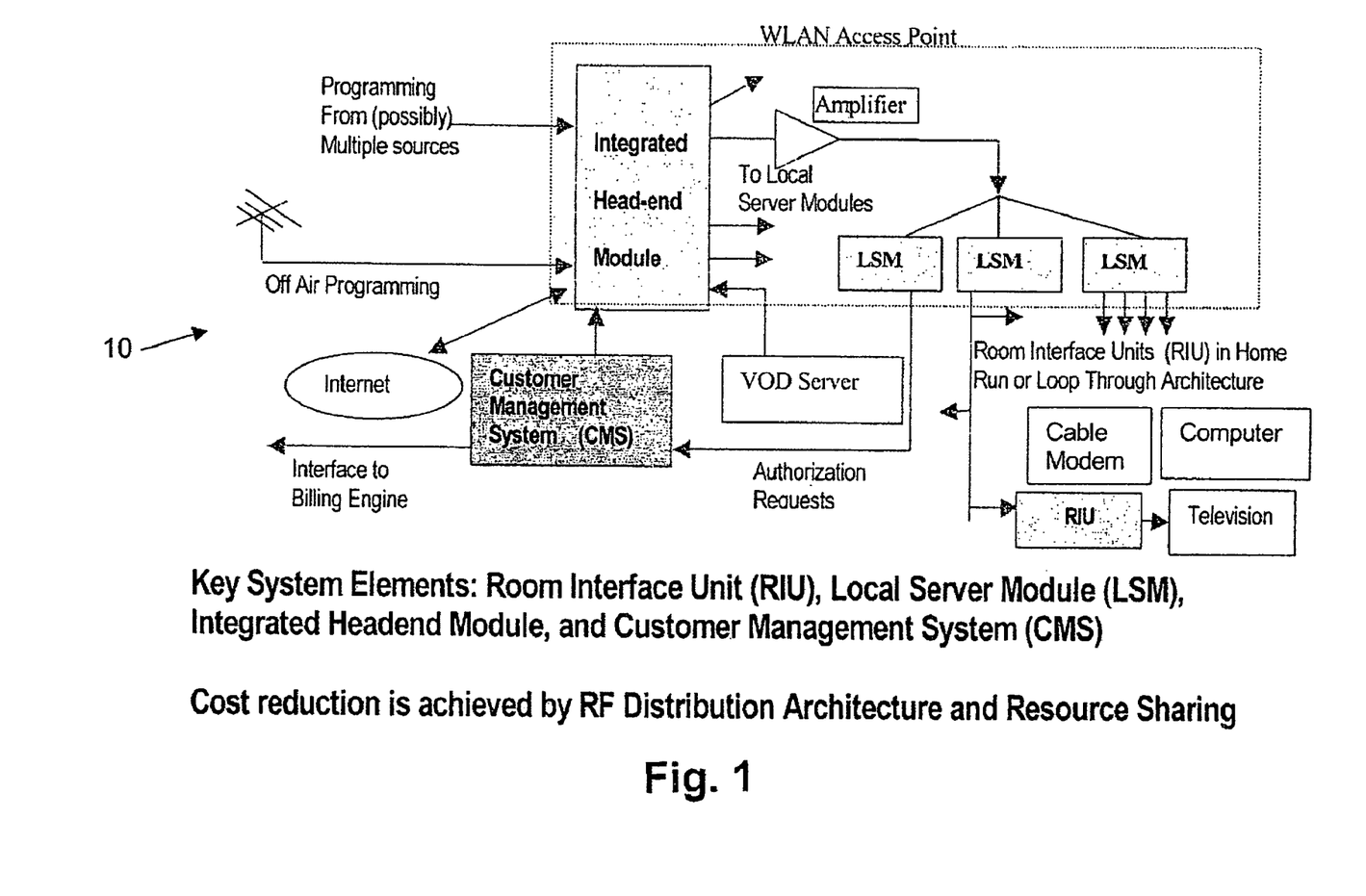
FIG. 1 is a block diagram of a video distribution system of the present invention.
Figure 2:
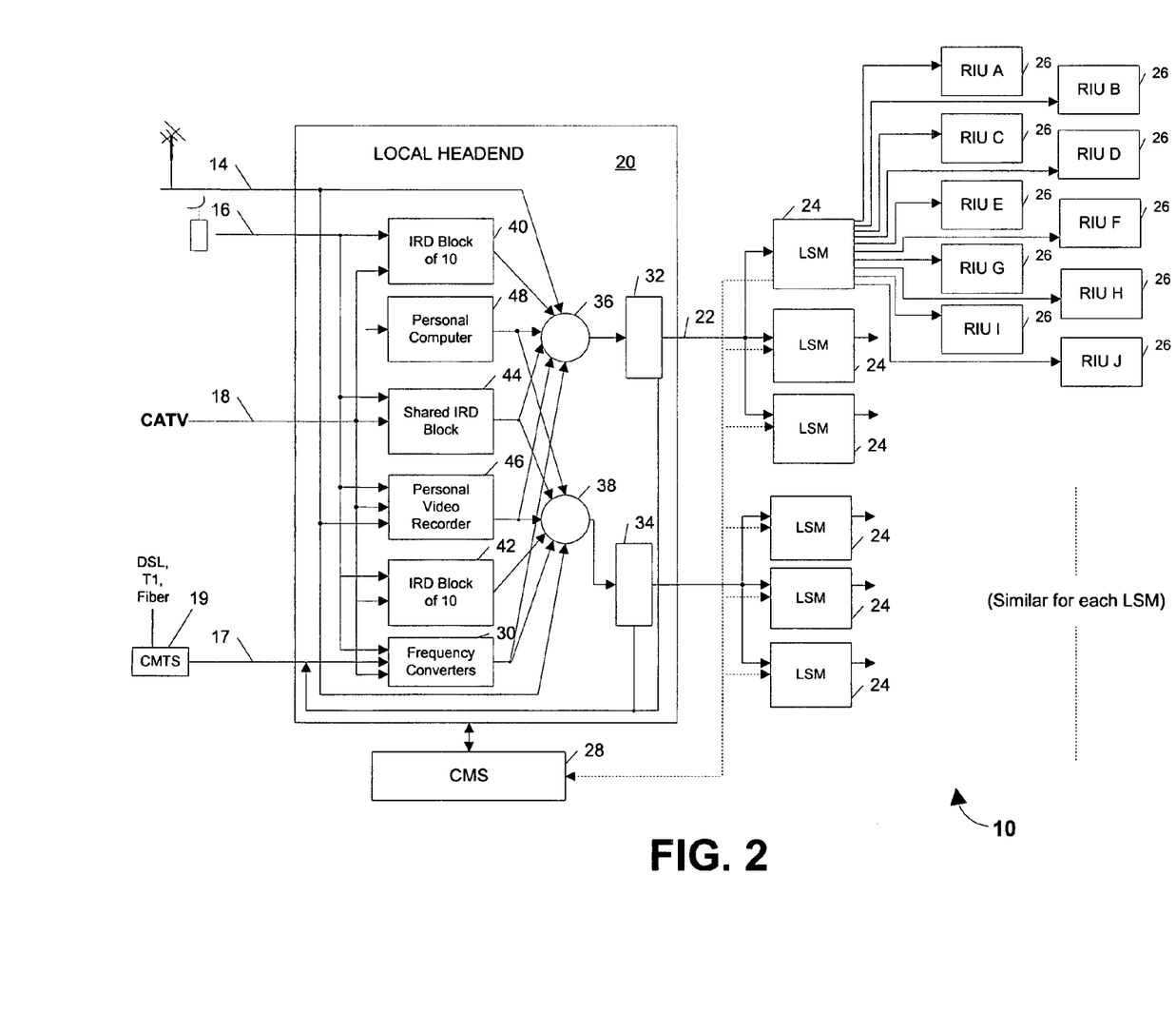
FIG. 2 is a block diagram of the video distribution system of FIG. 1, showing further detail about a headend thereof.

The present invention is first described in conjunction with a video distribution system 10 shown in FIGS. 1 and 2. FIG. 1 shows a generalized block diagram including a basic system description of the video distribution system 10. As will be described in further detail below, the system 10 achieves cost reduction by distributing RF and microprocessor components further upstream. The system includes key elements such as an Integrated Headend Module (IHM), a Customer Management System (CMS), Local Server Modules (LSMs), and Room Interface Units (RIUs), each of which will be described in further detail below.

The video distribution system 10 is shown in simplified form in FIG. 2. An antenna may provide a broadcast television antenna signal 14 that is provided to a local headend 20. The local headend 20 is to be distinguished from a cable headend. The local headend may be located at or proximate to a multiple-dwelling unit or in the case of single-family homes, it may be located at a cable node. In addition, a dish antenna may provide a satellite dish signal 16 to the local headend 20. Similarly, a cable from a local cable television service provider (e.g., an MSO) may provide a cable television signal 18 to the local headend 20. The signal 18 may come from a regional or cable headend or a satellite delivery and transportation system such as a Digital To Home platform, or other suitable cable delivery system, or a combination thereof. The signals 14, 16, or 18 may contain one or more digital multiplex signals. In addition, the cable provider or an alternative provider could provide high-speed Internet connectivity 17 via coaxial cable or other high-speed media that is typically compliant with the Data Over Cable Service Interface Specifications (DOCSIS) to the local headend 20. Alternatively, Internet connectivity could be provided via T1, DSL, Fibre, satellite, or other suitable means. In which case, a Cable Modem Transmission System (CMTS) 19 is inserted as shown in order to provide DOCSIS compliant data 17. The headend 20 receives the four signals 14, 16, 17, and 18 while it performs processing that will be described in further detail below, and provides a multiplexed channel signal 22 to a group of local service modules (LSMs) 24. As can be seen in this example, the particular multiplexed channel signal 22 is provided to a group of three local service modules 24, each of which may be located proximate, or at least in the direction of, a group of customers. In turn, each local service module 24 performs certain processing that will be described below and provides video channels to a plurality of room interface units (RIUs) 26, one or more of which is located at each customer's home (each RIU 26 corresponding to a television set in the home). Other details of the processing of the room interface unit 26 will also be discussed below. A customer integrated management system (CMS) 28 is also located proximate (or in) the local headend 20 and provides certain communication between each of the local service modules 24 and the headend 20.

In this example, the local headend 20 includes a first and second tuner/IRD block of ten, 40 and 42 respectively. The headend 20 also includes a shared tuner/IRD block 44. An IRD, or Integrated Receiver Decoder, in this example could be a simple digital set top box, or a printed circuit card including the functions of RF signal reception, conversion into baseband, decoding of the resultant digital bitstream, selection of the proper program id, and decoding and decryption to convert the signal into its video and audio components. Each IRD block could include a number of such set tops (e.g., 10) or alternatively a set of one or more plug-in printed circuit cards that perform the IRD functions on a number of channels (e.g., 10). In each case, the output of each IRD in the IRD block is modulated (if the IRD output is at baseband, that is audio and video components) or frequency converted (if the IRD output is at a channel frequency such as channel 3 or channel 4) to a unique predetermined channel frequency for each IRD in the IRD block.

It should also be pointed out here that the modulator and frequency converter of the output of each IRD, PVR, or Frequency converter could be set up such that the signal is "Frequency Inverted", by which it is meant that the signal in any channel is inverted about its center frequency such that the video frequency, which typically occupies the low end of the channel occupies the high end, and the audio that normally occupies the high end of the channel occupies the low end. This makes it very difficult for some thief to cut or tap into the cable between the headend and the LSM and have unauthorized access to the programming.

The headend 20 further includes one or more Personal Video Recorders (PVRs) 46 and one or more Personal Computers (PCs) 48 used as Menu Servers for communication with individual subscribers, all of whose outputs are also modulated to unique individual channel frequencies. In addition, the headend 20 could include Video On Demand (VOD) servers (not shown). Each of the tuner/IRD blocks 40, 42, and 44 and each of the PVRs are receptive of the satellite dish signals 16 and the cable television signal 18. In addition, the PVRs 46 are receptive of the broadcast TV antenna signal 14. The PCs 48 are receptive of an Internet over television signal that could be a part of one of the signals 14, 16, or 18, or could come over a separate line such as a DSL line (not shown). The PCs are capable of serving designated dynamic menu pages either locally generated in the PC or received via the Internet. Each of the tuner/IRD blocks 40, 42, and 44, the PVRs 46, and the PCs 48 provide an output that is provided to one or both of a first and second signal combiner 36 and 38. Each of the tuner/IRD blocks of ten 40 and 42 include ten separate combination tuners and integrated receiver/decoders (tuner/IRDs), although the invention is not limited to this particular number. As is well known, each of these tuner/IRDs can act as an IRD by independently receiving, demodulating, demultiplexing, and decoding/decrypting a selected video channel from a video source such as the satellite dish signal 16 or the cable television signal 18 and provide a modulated output therefrom at a desired RF frequency. Alternatively, the tuner/IRD can merely act as a tuner by simply converting the frequency of the selected incoming video channel to a desired frequency. These tuner/IRDs can be externally controlled by the CMS 28 to either receive and decode or simply tune to a particular video channel from either the satellite dish signal 16 or the cable television signal 18. The CMS 28 commands each tuner/IRD to control which video channel from which of the input signals 16 and 18 will be received and decoded or tuned. The PVRs 46 provide PVR service on an "on demand" basis to subscribing customers, as is well known. The PCs 48 receive Internet data and format it for television to allow paying subscribers to use an Internet service over their television. The signal from the PCs 48 is then modulated to a cable channel frequency and sent to the signal combiners 36 and 38. These services are created as HTML or XML pages that are properly formatted for television viewing and sent to the appropriate customer television set modulated at the appropriate television frequency.

The headend also includes circuitry for allowing the DOCSIS signals and digital multiplexes of channels (i.e., 6 MHz channels where the contents are a number of digitally compressed and encrypted programs) to be routed to and from each RIU 26. The Internet connectivity signal 17 as well as any digital multiplexes in signals 14, 16, or 18 is provided to one of a group of frequency converters 30 that converts the forward channel DOCSIS signals or desired multiplex channel from the frequency they are provided on to a predetermined cable channel frequency for passage to the signal combiners 36 and 38 and on to the LSMs 24 and RIUs 26. A pair of diplexers 32 and 34, one each associated with one of the signal combiners 36 and 38, respectively, route signals above a certain frequency (as per system design, for example 200-500 MHz) to the LSMs 24. These signals are multiplexed together as the multiplexed channel signal 22. The diplexers also route signals below that threshold frequency back to the Internet connection 17 to be sent back to either the in house CMTS or the cable channel CMTS, as is shown in FIG. 2. The DOCSIS channel is not processed by the frequency conversion circuits of the LSM 24, and it is therefore set up at a frequency range that the LSM does not handle, for example in this case at 150 MHz, which is outside the video forward frequency of 200-400 MHz, the DOCSIS return path frequency of 10-45 MHz, and the LSM-RIU communication frequency of below 10 MHz. Such frequency allocation allows for minimum bandwidth usage and at the same time keeps key frequencies sufficiently separated from each other for effective filtering to keep signal purity intact, and to minimize channel loading, problems such as composite triple beat, and interference. In this manner, the forward DOCSIS path and the return DOCSIS path is accommodated. As is discussed below, the Internet connection could be from a cable provider or it could be via the CMTS 19 as shown in FIG. 2 via DSL, T1, or Fibre cable.

Others of the group of frequency converters 30 could be used to convert or translate frequencies for incoming digital multiplex signals and send them along to the LSM for eventual routing to any subscriber that is authorized to directly receive digital programming for example for viewing on a High Definition Television (HDTV) set.

In this example, the output of the first tuner/IRD block of ten 40 is provided to the first signal combiner 36 and the output of the second tuner/IRD block of ten 42 is provided to the second signal combiner 38. The output of the shared tuner/IRD block 44 is provided to both the first and second signal combiners 36 and 38. The number of tuner/IRDs that may be provided in the shared tuner/IRD block 44 can be selected by the system designer based on the particular application for which the video distribution system 10 will be used. For example, the number of tuner/IRDs that are needed for the system 10 in one community or application may be different than the number needed for a different community or application. The broadcast television antenna signal 14 is also received by the headend 20 and provided to each of the signal combiners 36 and 38.

In this example, wherein a different group of thirty RIUs 26 is connected to each of the signal combiners 36 and 38, it is assumed that the thirty RIUs 26 will have a typical 30% subscription rate to premium channels, such as HBO, Showtime, and Cinemax. Since 30% of thirty subscribers is nine, the dedicated block of ten for each signal combiner should allow each of the premium subscribers to have a dedicated tuner/IRD to allow them to watch their selected video channel. In this example, the two tuner/IRD blocks of ten 40 and 42 may be used to provide premium channels to those subscribers who are authorized to view the premium channels, while the shared tuner/IRD block 44 may provide other "basic" cable channels such as ESPN and CNN that are commonly viewed by multiple subscribers. Experience shows that the use of shared tuner/IRD blocks such as these may provide an additional 10-20% capacity. This additional capacity can possibly be used to promote the premium or pay services to non-subscribing customers in order to increase service demand, penetration, and revenues. Of course, if buy rates for the premium services increases in certain buildings or building complexes, then additional IRDs in any IRD block or more IRD blocks per system can be employed.

In this example, each tuner/IRD in a given tuner/IRD block of ten provides an output at a fixed frequency that is different from the output frequencies of the other tuner/IRDs in that block. These frequencies may be selected to be three video channels apart (or some other suitable number such as one or two, for example) depending upon filtering needs for signal purity, where each video channel is typically 6 MHz in bandwidth. Thus, the ten channels from each tuner/IRD block of ten may consume 180 MHz and may fall somewhere in the range of 450-750 MHz. Of course, the signal from the shared tuner/IRD block 44, as well as the DOCSIS channel are selected to be at frequencies that do not interfere with the output frequencies of either tuner/IRD blocks of ten and, in addition, do not interfere with any of the local broadcast video channels received on the broadcast television 14. For example, if the local UHF channel falls in the range of 575 MHz, none of the tuner/IRDs in the tuner/IRD blocks of ten 40 and 42, or the shared tuner/IRD block 44, shall be selected to provide an output at this frequency. Alternatively, the local UHF channel may be frequency translated to some other non-interfering usable frequency.

As is shown in FIG. 2, the multiplexed channel signal 22 is provided from the signal combiner 36 of the headend 20 to a set of three local service modules 24. In addition, a second, and potentially different, multiplexed channel signal 22 is provided from the second signal combiner 38 of the headend 20 to a different set of three local service modules 24. In this example, each local service module 24 may be located proximate, or at least in the direction of, a group of customers. The multiplexed channel signal 22 from the first signal combiner 36 may serve the first three local service modules, while the multiplexed channel signal 22 of the second signal combiner 38 may serve the next three local service modules. In a system serving 120 televisions, for example, the local headend output will be four multiplexed channel signals 22, each serving three LSMs 24. While the frequencies of each of the channels in the different multiplexes 22 will be the same, the content of many of these channels will be different, depending upon their usage of shared IRD blocks, PVRs, or PCs at any given point in time. As is shown in FIG. 2, each local service module 24 provides a separate signal to each of the ten room interface units (RIUs) 26 that are associated with that local service module, one RIU associated with each television. For ease of illustration, only the RIUs 26 are shown for the first LSM 24. As is often the case in communities with single-family homes, the lines from the LSM 24 to each RIU 26 are "home runs" (separate lines to each home). Nothing about the present invention, however, prevents the LSM from delivering services on a loop-through or tree-and-branch basis if that is the architecture in a particular community or application.

Figure 3:
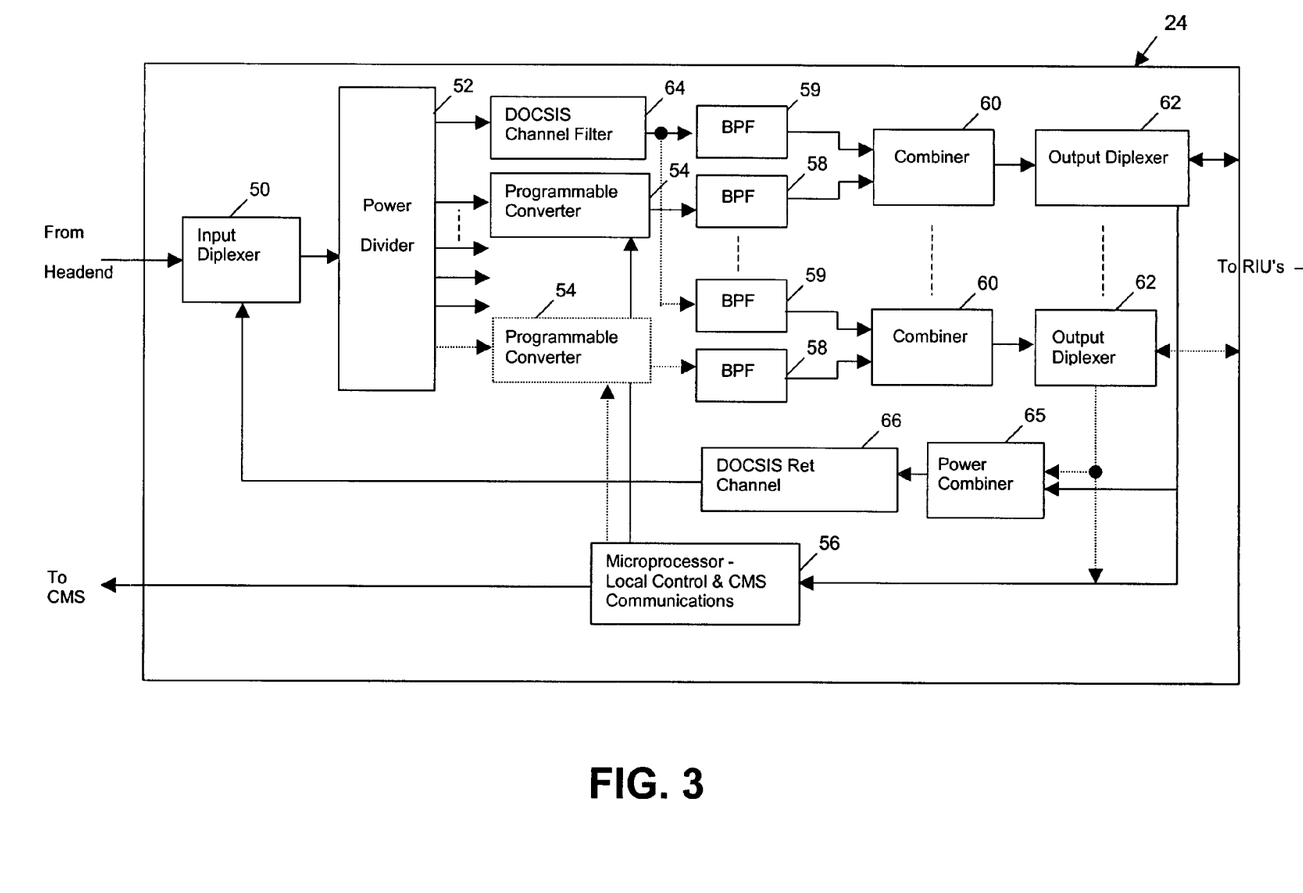
FIG. 3 is a block diagram of a local service module (LSM) of the video distribution system of FIG. 2.

A block diagram of the contents of each of the local service modules 24 is shown in FIG. 3. The local service module 24 includes an input diplexer 50, the function of which will be described in more detail below. The diplexer 50 receives the multiplexed channel signal 22 from the headend 20 and passes the signal to a power divider 52 (which may be a 12-way power divider, a commonly available component). The power divider 52 divides the multiplexed channel signal 22 into a plurality of identical multiplexed channel signals, each of which is provided to a separate programmable converter 54 or to a DOCSIS forward channel filter 64. It may only be necessary for there to be a single DOCSIS forward channel filter 64 for each LSM 24. Each of the programmable converters 54 is controllable by a microprocessor 56 to convert a video channel or a chosen digital multiplex 6 MHz channel for a digital customer selected by the microprocessor from its frequency in the multiplexed channel signal 22 to a predetermined fixed frequency at a frequency location that is assigned to a particular corresponding RIU 26. In this example, the ten programmable converters 54 in the local service module 24 may for example be designed to provide an output frequency somewhere in the range of 130 to 500 MHz. Just downstream from each of the programmable converters 54 is a bandpass filter (BPF) 58 with a narrow frequency band through which a signal can pass, that frequency band being centered at the output frequency of the programmable converter. Alternatively, by appropriate choice of programmable converter input and output frequencies and using methods such as dual frequency conversion, the BPF 58 can be made less stringent and indeed quite broad without sacrifice in signal quality. The outputs from these bandpass filters 58 are each provided to a separate power combiner 60. The power combiners 60 also receive the DOCSIS forward channel signal that is intended for that corresponding RIU 26, after that DOCSIS channel has been passed through a bandpass filter 59 that allows only the DOCSIS forward channel for that particular corresponding RIU 26 to pass therethrough. The power combiner 60 essentially frequency multiplexes the two signals (one from the programmable converter 54 via the bandpass filter 58 and one from the bandpass filter 59) to provide a frequency multiplexed signal that is provided to a corresponding output diplexer 62. The multiplexed signal is then provided from the output diplexer 62 to the corresponding RIU 26 as is shown in FIG. 2.

Alternatively, it is also possible to replace the programmable converters 54 with demodulators/remodulators. This design, however, may not work with digital multiplex signals, and requires more stringent filtering, although allowing two empty video channels between adjacent channels could help in this regard. In addition, in order to demodulate and remodulate in a fashion that preserves the quality of the audio, such as with stereo sound and video channels, it may be required to utilize more expensive modulation components, which would be undesirable. On the other hand, the frequency conversion approach has the advantage of maintaining the spectral purity of the signal intact so as to allow stereo sound to pass therethrough where possible. In addition, the hardware required to do the frequency conversion may be more readily available and affordable than the demodulator/remodulator approach. Furthermore, with the frequency conversion approach, identical programmable converters can be purchased so that the bulk purchase of a small number of different components can be utilized for this design.

As another alternative, the LSM 24 could be configured to send a single frequency-multiplexed signal that combines the output of many LSM channel outputs from filters 58 into one individual 11 way combiner 60 that combines the DOCSIS channel and the 10 LSM channel outputs, intended for different RIUs that is sent to each of its RIUs in loop-through or tree-and-branch fashion. Such an architecture is discussed in more detail in U.S. patent application Ser. No. 10/666,646, filed on Sep. 17, 2003, entitled "Video Distribution System with Increased Centralized Processing," the entire contents of which are incorporated herein by reference.

The input diplexer 50 provides the function of separating the upstream DOCSIS return channel from the downstream multiplexed channel signal 22. As described above, the multiplexed channel signal 22 may include a plurality of video channels in the range of approximately 350-800 MHz. The DOCSIS return channel may typically be in the range of 10-15 MHz, but a range of 10-45 MHz may be reserved. The input diplexer 50 receives the relatively-higher frequency, multiplexed channel signal 22 from the headend 20 and passes it directly through to the power divider 52. The input diplexer 50 also receives the relatively-lower frequency, DOCSIS return signal which it routes back to the headend 20. The DOCSIS channel filter 64 is a bandpass filter in place between the power divider 52 and combiner 60 to allow only the DOCSIS forward channels to pass therethrough. This channel filter may be a bandpass filter at the frequency selected for the forward DOCSIS channels. A power combiner 65 and DOCSIS return channel frequency converter 66 receives the DOCSIS return channel signals at separate fixed frequencies from the output diplexers 62 of the local service module 24 and provides a frequency-selectable return signal back to the cable modem transmission system (CMTS) (at the cable headend) in compliance with DOCSIS specifications. Thus, it is not necessarily a fixed return frequency. By providing a DOCSIS return channel frequency converter 66 at this location, it is possible to have the DOCSIS circuitry in the RIUs 26 operate at fixed frequencies so as to reduce costs while still allowing the DOCSIS return signal to the CMTS to be at a selectable frequency as required by DOCSIS and cable system requirements. Alternatively, the frequency conversion for the return path could take place at the headend 20.

The output diplexers 62 operate in a similar fashion to the input diplexer 50, in that they routes signals in different directions depending on the frequency thereof. In this example, for signals of a frequency at or above 50 MHz, those signals are passed to the corresponding RIU 26. On the other hand, the frequencies lower than 50 MHz received from the RIU 26 are passed to the DOCSIS return channel frequency converter or filter 66 (via the power combiner 65) or to the microprocessor/controller 56. This allows for communication between the RIU 26 and the microprocessor/controller 56 of the local service module 24. The microprocessor/controller 56 includes filters, transmitter and receiver circuits that allow the LSM to two-way communicate at separate frequencies with each RIU 26 simultaneously. Such communications, for example, can occur at around a 2 MHz frequency with a method such as Frequency Shift Keying (FSK), which takes up about 20-40 KHz per RIU channel. Just as the DOCSIS return channel operates at a fixed frequency in the RIU 26 and in the portion of the local service module 24 that is upstream (in the return path) of the DOCSIS return channel frequency converter 66, the forward DOCSIS channel that is downstream of the headend is also at a fixed channel frequency to allow for simplified product design. The data path shown in FIG. 2 from the LSMs 24 to the CMS 28 (to allow the microprocessor/controller 56 of each LSM 24 to communicate with the CMS 28) can be via a separate cable (such as an RS-232 cable) from the cable that carries the multiplexed channel signal to the LSMs 24.

Figure 4:
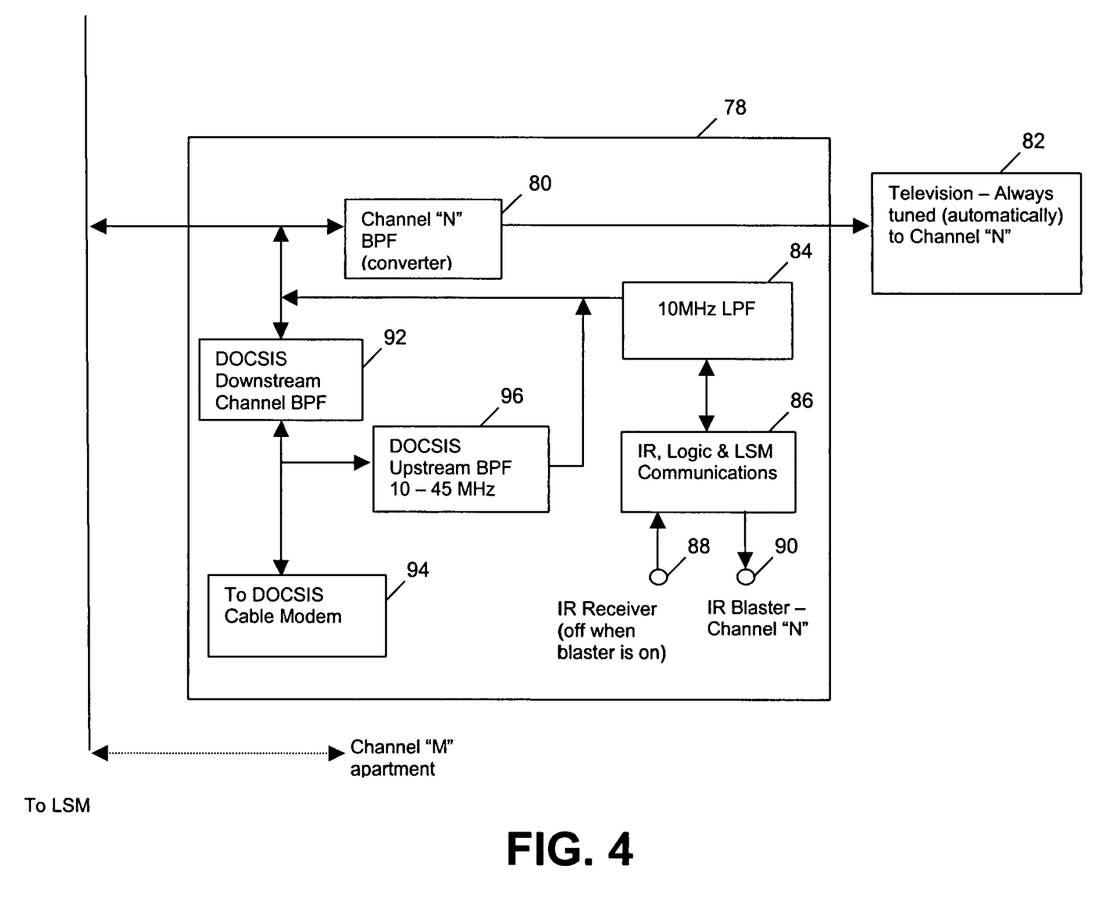
FIG. 4 is a block diagram of an analog room interface unit (RIU) of the video distribution system of FIG. 2.
Figure 5:
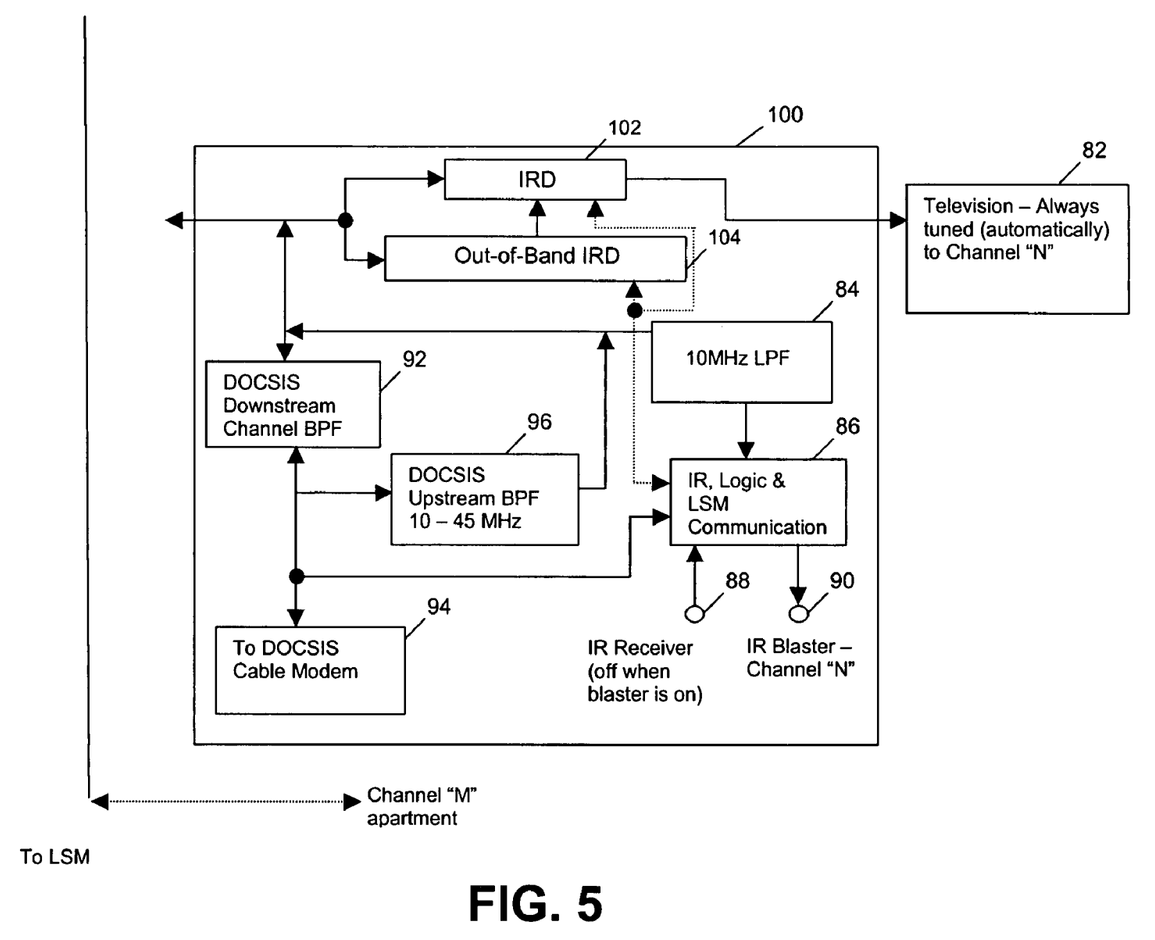
FIG. 5 is a block diagram of a digital room interface unit (RIU) of the video distribution system of FIG. 2.

The details of the RIU 26 can be appreciated in FIGS. 4 and 5. The RIU 26 can be of one of at least two different varieties. One variety is an analog RIU 78 shown in FIG. 4. Another variety is a digital RIU 100 shown in FIG. 5. The analog RIU 78 can only receive and pass video channels with analog programming thereon to its corresponding television while the digital RIU 100 can receive the video channels with analog programming thereon, the video channels with digital programming thereon, and certain out-of-band channels. The design of the video distribution system 10 is such that the local headend 20 and the LSM 24 do not care (and operate just as well) whether analog or digital RIUs are connected to them or in what combination of each. One job of the local headend 20 and LSMs 24 is to pass a 6 MHz video channel on to the RIU, if that RIU is authorized to receive that video channel. Contained in that 6 MHz video channel may be an analog video and audio signal or it may be a compressed and multiplexed group of digital video and audio signals, known as a digital multiplex. The contents of the 6 MHz video channel sent to the RIU generally matter only to the RIU. Since the LSM 24 is not concerned with whether it is passing a 6 MHz video channel to an analog customer or to a digital customer, then the processing in the LSM can be substantially easier.

The analog RIU 78 includes a bandpass filter 80 that allows the video channel frequency utilized by the LSM 24 to pass therethrough. This video channel passes through to a television 82 which is automatically tuned to the proper video channel frequency, as will be described in further detail below. Thus, if we assume that the LSM 24 being illustrated in this example is designed to provide a video channel at a frequency at approximately 171 MHz, then the bandpass filter 80 will be selected to pass only frequencies in that range and the television will be tuned to that channel which is commonly known to be channel 22 from the standard U.S. CATV channel frequency allocation. Of course, this does not necessarily mean that the programming the customer sees on his television 82 corresponds to the program material that the local CATV provider typically provides on cable television channel 22. Instead, it means that this customer will always receive his selected channel, whatever channel that may be, on channel 22. As will be described in further detail below, he can choose/select any channel he is authorized to receive and the programmable converter 54 in his corresponding local service module 24 will be automatically programmed to tune to that selected channel and his selected video channel will be provided on the frequency which his television understands to be CATV channel 22. Thus, it can be appreciated that each television and RIU has a corresponding programmable converter 54 in its corresponding local service module 24. More specifically, there is a one-to-one relationship between each programmable converter 54 and a specific RIU, although there may be more than one RIU and television per home.

Continuing with the description of the RIU 78, a low pass filter 84 and an IR, Logic, and LSM communication unit 86 work together to allow the customer to select channels and to automatically tune the television 82 to channel 22, in this example. The communication unit 86 receives a signal from an infrared (IR) receiver 88 when the customer operates his television remote to select a different channel. The communication unit 86 has sufficient processing therein to be able to receive communications from a variety of different types of manufacturers' television remote controls. The communication unit 86 recognizes that the customer has requested a different channel and a signal (less than 3 MHz) is sent upstream through the low pass filter 84 (which may pass frequencies below 10 MHz in this example). This signal is sent back to the local service module 24 where the output diplexer 62 routes the signal to the microprocessor 56, as shown in FIG. 3. The communication unit 86 may be designed to append a predetermined code to each request to the LSM 24 that signifies which RIU or home the request comes from, or alternatively communicate at a slightly different frequency for each RIU to allow the microprocessor/ controller 56 to differentiate communications from different RIUs, using Phase Lock Loop (PLL) circuitry. The communication unit 86 can also be designed to answer simple queries from the LSM 24 so that any tampering with the RIU 78 can be detected.

The microprocessor 56 (of the LSM 24) determines if the channel selected is a local broadcast channel. If so, then the microprocessor 56 commands the programmable converter 54 that corresponds to this particular RIU to convert that broadcast channel to the fixed frequency (channel 22) already predetermined for communication from the local service module 24 to the RIU 26 and television 82, as previously described. If the channel selected is not a local broadcast channel, then the microprocessor 56 sends a signal to the CMS 28 (FIG. 2) which in turn commands a tuner/IRD in either the corresponding tuner/IRD block of ten or the shared tuner/IRD block 44 to receive and decode the selected video channel. As is well known, the tuner/IRD can place textual information in the video portion of the video channel (for a desired number of seconds) to inform the customer of the channel selected and certain other program information as may be desired or may be required by regulatory agencies. The CMS 28 informs the microprocessor 56 in the local service module 24 of the frequency where the selected tuner/IRD has placed that selected video channel. The microprocessor 56 of the local service module can then command its corresponding programmable converter 54 to tune to that selected frequency and thus provide the selected video channel to the corresponding RIU 26 at the fixed frequency (channel 22). If the customer is not a paid subscriber as to the selected video channel, then a message is created by the CMS informing the customer that a subscription fee is needed and offering alternative methods and durations of such a subscription. This message may be created by HTML or XML or other suitable format and sent to the television as a web page via one of the Menu Server PCs, 48.

As an alternative to the microprocessor 56 of the LSM 24 sending a signal to the CMS 28 when a non-local channel is requested, it would be possible for the microprocessor to first check to see if any other RIU that is receiving signals from this LSM 24 (or from any other LSM receiving the same multiplexed channel signal 22) is viewing the requested channel. If so, then the microprocessor 56 could simply signal the programmable converter 54 that corresponds to this particular RIU to convert that incoming channel from the local headend 20 to the fixed frequency (channel 22) already predetermined for communication from the local service module 24 to the RIU 26 and television 82. In this manner, two different RIUs could view the same channel sent from the local headend 20 without the need to send that same channel twice from the local headend 20 to the LSM 24. If, however, it is desirable or required for program annunciation information to be displayed when a channel is initially selected, then this approach will have to be modified.

At the same time this channel selection is taking place in the RIU, the local service module 24, and the headend 20, the communication unit 86 of the RIU needs to make sure the television 82 does not change channels to the channel selected by the customer. This is accomplished with the IR blaster 90, which transmits a channel request to the television 82 to remain tuned to channel 22. Of course, as is well known, IR blasters have sufficient power to allow the infrared signal to reflect from any surface in the room until it reaches the television 82. Furthermore, the communication unit 86 has sufficient processing to allow it to generate a channel request signal via its IR blaster 90 in the format expected by the television 82. Should the IR blaster 90 be blocked in some fashion by the customer so that the channel request signal cannot be transmitted to the television 82, the customer will have problems changing to the desired channel.

The RIU 78 also handles DOCSIS signals received from the local service module 24. A DOCSIS downstream channel bandpass filter 92 allows the forward DOCSIS channel to pass therethrough at its predetermined frequency. This forward channel is passed to a DOCSIS cable modem 94 which may be in communication with a computer, as is well known. The DOCSIS cable modem 94 passes a return channel DOCSIS signal to a DOCSIS upstream bandpass filter 96, which may allow signals in the range of 10-45 MHz to pass therethrough. This signal is provided back to the corresponding output diplexer 62 of the local service module 24.

If a customer requests a program guide, a tuner/IRD channel is assigned to that customer to display the program guide. If a customer requests to operate in an interactive mode on an "interactive enabled" program, the LSM 24 passes the request back to the CMS 28. If the customer is currently on a dedicated tuner/IRD, the CMS 28 passes the request to that tuner/IRD, which sends the appropriate information to the customer. If that tuner/IRD is not "interactive enabled" then a message such as "This feature is not available on this channel" is superimposed on the video. If the customer is on a shared tuner/IRD when the request to operate in interactive mode is received, the customer is switched to a dedicated tuner/IRD, which dedicated tuner/IRD is also sent the interactive request after the appropriate delay for the channel acquisition by the tuner/IRD.

The customer's use of a PVR 46 (or VOD server) requires authorization or system OK to such a service. If the customer does subscribe to the service, then upon request a PVR or VOD resource at the headend 20 will be dedicated to the customer. The PVR 46 tracks the customer's tastes and records programs automatically or on command. When the customer is viewing material recorded by the PVR 46, the signal therefrom is modulated to a video channel frequency and sent to the appropriate signal combiner.

The tuner/IRDs can also be equipped with interactive game capability, which can be offered on a subscription basis to customers. Such a service would also use a dedicated tuner/IRD, similar to the interactive mode operation described above. Such a service can be heavily promoted and can allow for a variety of types and lengths of subscriptions. Since the television service is web enabled, properly formatted web games can also be played on the system. For example, card games might be very attractive in elderly or retirement communities.

As can be appreciated, with each of the ten RIUs corresponding to that local service module 24 operating in a similar fashion, the local service module 24 provides a separate signal to each RIU. The television 82 attached to that corresponding RIU would receive only the video channel selected by the local service module 24. As can be appreciated, if a customer in a given home decides to bypass the RIU and hooks the television 82 directly to the signal coming from the local service module 24, then that customer can still only receive the one video channel provided by the local service module 24. In addition, that customer will have not have the ability to enter a request to select a different channel, so the customer will be restricted to watching the channel selected by the LSM 24, if any. In other words, the customer would have no control over what channel he is watching. Furthermore, attaching a television 82 directly to the signal from the local service module 24 may allow the local service module 24 to detect the leakage of the local oscillator signal from the television 82 so that the local service module 24 can determine that someone has bypassed their RIU. Such tampering could be reported further upstream so that actions could be taken.

An alternative design would provide for a frequency converter in the RIU rather than the channel 22 bandpass filter 80. In this case, the frequency converter in the RIU would convert channel 22 to a standard channel such as channel 3 or 4 to which the television 82 could be tuned, such as is common with a VCR. This design would allow for another technique for foiling customers' attempts to bypass the RIU. This could be done by having the programmable converter 54 in the local service modules 24 perform a spectral inversion so that the 6 MHz video channel could be flipped to place the audio portion at a relatively lower frequency than the video portion. Of course, conventional video channels have the video portion at a relatively lower frequency than the audio portion. The frequency converter in the RIU 78 would also be spectrally inverting so that it would return the frequency composition of the video channel to the typical arrangement for receipt by the television 82. In this case, if the customer were to attempt to bypass the RIU 78, the television 82 would receive a spectrally inverted signal and nothing usable could be viewed or listened to through the television 82. In this case, it may be desirable to provide the customer with a separate remote for commanding channel changes through the RIU 78, and the IR blaster function could be eliminated from the RIU.

It is a commonly accepted specification in the broadcast and cable industry that the signal provided to a television should have greater than a 40 dB signal-to-noise ratio. The typical output specification of a tuner/IRD is greater than 60 dB signal-to-noise ratio. Although as many as three frequency conversions (each having a noise figure of 8.7 dB) take place between the tuner/IRD and the television, with appropriate low noise gain blocks, the noise figure of the entire path to the customer's television 82 can be made to be less than 10 dB. This provides a 10 dB margin at the customer television by providing a signal-to-noise ratio of at least 50 dB. In actuality, the margin could be made much higher.

The digital RIU 100 (FIG. 5) has many identical components to the analog RIU 78, with the low pass filter 84, communication unit 86, IR receiver 88, IR blaster 90, DOCSIS downstream BPF 92, DOCSIS cable modem 94, and DOCSIS upstream BPF 96 playing similar roles. Instead of a BPF 80, however, the digital RIU 100 includes a first IRD 102 and a second IRD 104. The first IRD 102 is utilized to tune to the incoming video channel sent by the programmable converter 54 of the LSM 24. The IRD 102 then processes the video channel as required, based on whether it contains analog video and audio signals (e.g., local broadcast signals coming from the broadcast TV antenna signal 14) or whether it contains compressed digital signals (e.g., the HBO multiplex signal that may be received in the satellite dish signal 16 or the cable television signal 18 received from the MSO). In the case of compressed digital signals such as the HBO multiplex signal, there may be 8 different virtual channels compressed and multiplexed therein, each containing a different HBO channel, for example. The IRD 102 can tune to the incoming video channel and then demodulate, demultiplex, and decode/decrypt it, before re-modulating the selected virtual channel to create an analog RF signal for an analog television. Such an IRD 102 can be designed to have an output that is a direct TV monitor output, a component video-audio output, or an S-Video output. Alternatively, prior to demodulation and decryption, digital signals can be sent to a digital television that is equipped with the appropriate Point of Deployment (POD) device as has been proposed by cable companies.

The second IRD 104 of the digital RIU 100 is used to receive out-of-band (OOB) communications, meaning communications relating to a particular video channel but not residing in the 6 MHz video channel frequency slot. This may include on-screen display commands and program specific information such as further detail about actors, characters, plot, etc., that the customer may choose to access. Also, the communication unit 86 communicates with the two IRDs 102 and 104 to pass information such as selected virtual channel, OOB information, and the like. In addition, the communication unit 86 may receive certain other information via the DOCSIS channel, some of which may also be passed along to the IRDs 102 and 104. At least for the digital RIU 100, and possibly for the analog RIU 78 as well, the communication unit 86 may include a microprocessor.

In order to send Program Guide and other interactive data to existing digital STBs that might still be utilized in place of the digital RIUs, private data sections in a transport stream (as defined in MPEG-2 specifications) could be employed to send to digital RIUs 100, while simultaneously the data can also be sent in an OOB channel or on the DOCSIS channel to digital RIUs 100. In addition, the digital STBs may have to be told which in-band channel to tune to and which OOB channel to tune to. In this manner, digital STBs and digital RIUs could co-exist in the same system.

Figure 6:
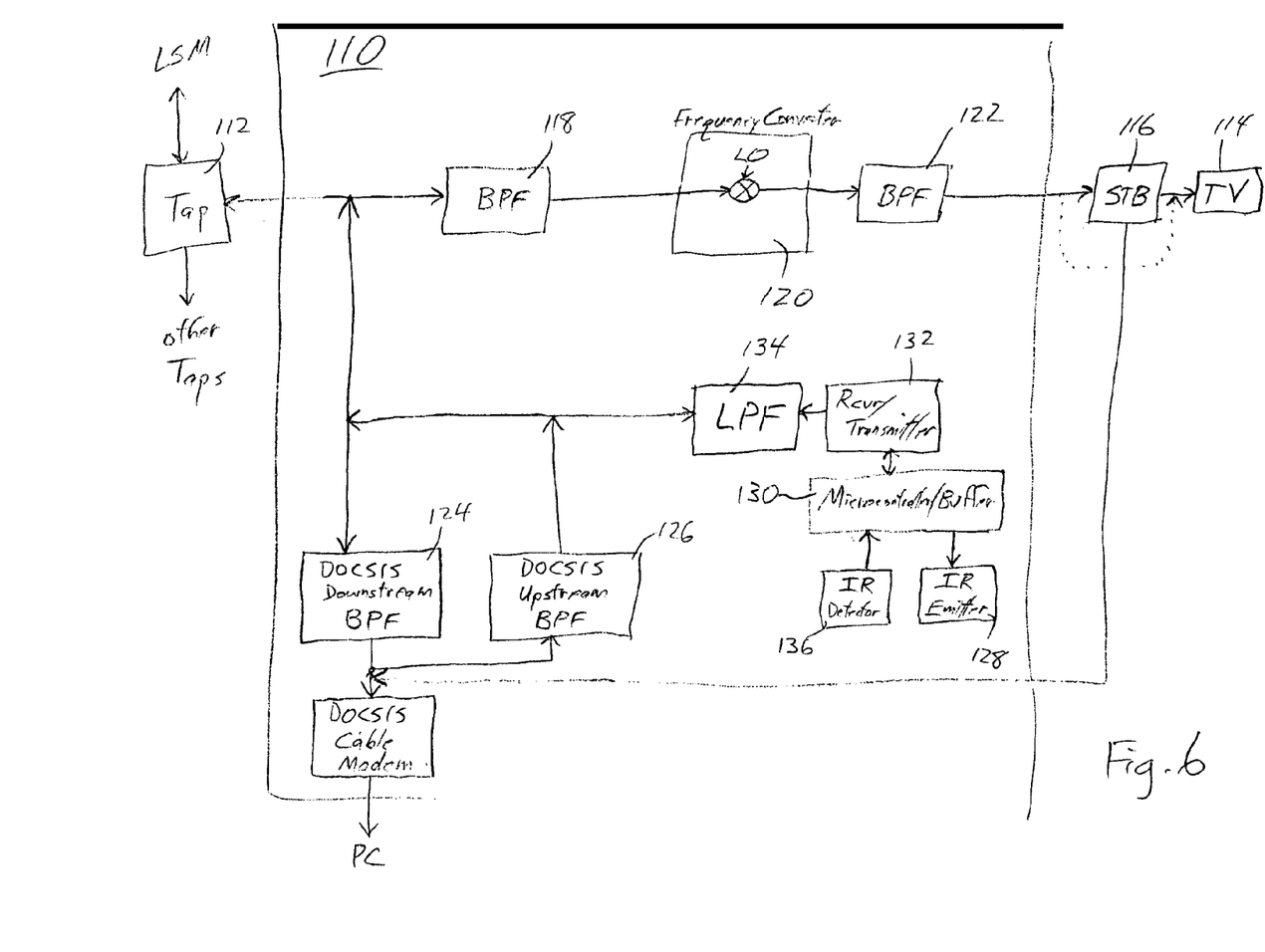
FIG. 6 is a block diagram of an alternative embodiment of a room interface unit (RIU) that could be a part of the video distribution system of FIG. 2.

An alternative method to deliver the desired digital programming to digital receivers or HDTV receivers is shown in FIG. 6. This method has the advantage that it can be used to send either digital or analog programming to a particular RIU and to a particular television without employing a different version of an RIU.

In this embodiment, either the Set Top Box (STB) or the analog TV receive the desired programming on a fixed center frequency, 6 MHz wide channel, as described before in the purely analog case description. In the digital case, however, the 6 MHz channel carries the desired digital multiplex. The set top box programming is modified to receive and convert the desired multiplex that comes from the RIU at the particular RIU frequency. The set top box then demodulates the RIU signal at this RF frequency, selects the appropriate programming from the multiplex of compressed digital signals, decrypts the digital signal, and sends it for display. Such a set top function can be realized in a set top box as described above, or as part of a digital television.

In this case, if it is desired to have the set top box requests sent directly back to the system, it is possible to have a separate STB return path that is shared with the DOCSIS return path as shown in FIG. 6.

In this fashion a single type of RIU 110 can then be used to handle digital or analog programming delivery requirements without having two models of RIUs for the two applications.

Referring to FIG. 6, we provide more detailed description of the circuits in FIG. 4 and another embodiment that allows for analog or digital signal reception from the RIU 110 using the same unit.

In this embodiment, the frequency inverted (therefore not TV viewable without re-inversion as discussed above) forward channels in a loop through scheme, or a single frequency inverted forward channel in a home run scheme, arrive at a tap 112 in the case of a loop through scheme, where the signal splits off for the RIU 110 associated with a particular television 114. Another line continues on to other taps associated with other RIUs. As stated previously, the television 114 may receive digital programming via a set top box 116 or, in the case of a digital television, it may receive the digital programming directly from the RIU 110. Alternatively (shown in phantom), the television 114 may receive analog programming directly from the RIU 110.

The incoming signal from the LSM via the tap 112 includes the DOCSIS forward channel, the video channel eventually intended for the television 114, and possibly other channels intended for other RIUs and televisions that are not shown in the drawing. A bandpass filter (BPF) 118 passes only the forward video channels and does not allow any of the control and communication signals associated with the RIU 110 or the DOCSIS forward or return signals through. The output of the BPF 118 is sent to a frequency converter 120, which is typically a synthesized frequency converter, set up in this case to convert one of the incoming television channels, the one that was intended for the television 114, to a fixed channel frequency to be sent to television 114. In this case the frequency converter 120 includes a mixer and a local oscillator (LO). The frequency converter 120 is in this embodiment a "High Side LO" frequency converter. Thus, if the desired input frequency is F1, and the desired output frequency to the television is F2, the LO frequency is given by F3=F1+F2. For example, a signal centered at 300 MHz and containing signals varying from 297 to 303 MHz is mixed with an LO at 370 MHz to give an output signal centered at 70 MHz containing signals varying from 67 to 73 MHz. Note that due to the subtraction that takes place at the mixer the portion of the signals that was originally at 297 MHz is now at 73 MHz and the portion of the signals that was at 303 MHz is now at 67 MHz. Thus, such a design frequency inverts the incoming signal (to restore the original orientation of the audio and video signals) so as to be viewable by the television 114. The output of the frequency converter 120 then passes through a fixed frequency single channel bandpass filter 103, typically a surface acoustic wave filter (SAW filter) that allows only the video channel intended for television 114 to pass. Such a design also assures that a television viewer intent on stealing the signal, if he or she removes the RIU 110 and connects the television 114 directly to the tap 112, will not be able to see any programming at all on their television, due to the frequency-inverted condition of the video channels that will not be restored to a proper orientation by the RIU 110 in this scenario.

In the case where the signal that is incoming to the RIU 110 is a digital signal, the processing described remains identical, except that the signal is a digitally modulated channel multiplex as previously described in this patent application. Such a digital signal will then preferably be received from the RIU 110 by the set top box 116 rather than directly by the television 114. The set top box 116 will demodulate, choose the proper bitstream, decode and decrypt the channel and send it on to the viewing apparatus, such as the television 114, which may in this case be a high-definition television.

The DOCSIS downstream channel passing through the tap 112 is filtered by a DOCSIS downstream bandpass filter 124 in the RIU 110 and sent to a DOCSIS cable modem which may or may not be part of the RIU 110. The DOCSIS upstream signal as well as set top box return signal, if any, are filtered by a DOCSIS upstream bandpass filter 126 in the RIU 110 and sent back to the LSM via the tap 110.

When a viewer that is viewing television 114 makes a request with a remote control (not shown), IR detector 128 receives this request, for example "Channel Up". The IR detector 128 is connected to a microcontroller/buffer 130, which modulates the request bitstream on to a specified frequency carrier, e.g. 2.015 MHz, and sends it via a receiver/transmitter 132 and a lowpass filter (LPF) 134 to the tap 112 and thence to the LSM. Each RIU communicates at a separate, distinct frequency in this fashion with the LSM, which has individual separate tuned receiver circuits for each RIU it serves. Therefore, the LSM can handle multiple simultaneous requests from many RIUs without any confusion. The LSM in turn sends back to the RIU the proper bit stream, similarly modulated at a specified forward frequency to command the television 114 or the STB 116 with tuning instructions to tune to the frequency of BPF 122. This return signal is passed by the LPF 134, received by the receiver/transmitter 132, decoded by the microcontroller/buffer 130, and sent to an IR emitter 136, which transmits the appropriate code to the television 114 or STB 116.

In those cases where a set top data return path is desired, for example for future video over IP functionality, the set top return signal can be combined with the DOCSIS cable modem return and sent back via the DOCSIS return channel.

It should be pointed out that this design gives an added level of security and warning capability to the system. For a person desirous of stealing the video signal, the first step would have to be to disconnect the RIU from the tap 112. The instant this happens, the LSM recognizes that there is no signal back from the microcontroller/buffer 106, and immediately alerts the CMS that this particular RIU is being tampered with, so that the facilities management or other authorities can take the appropriate steps to apprehend the perpetrator. This in addition to the fact that due to the frequency inversion the potential thief will not be able to view or record the desired programming in any way.

As can be seen, the CMS has many important functions to perform in the system. It communicates with each LSM, receiving requests from various TV viewers and instructing each LSM the appropriate channel to tune each converter to so as to meet customer needs. It also decides whether any particular customer is allowed access to any requested programming. It keeps record of each customer request and how it was processed. If the customer is not authorized to receive the requested channel, it activates a menu server PC with the appropriate message enabling the customer to decide if he/she wants to pay for the programming, and processes such payment. It communicates with one or more central authorities (apartment managers or service providers) to give them usage and billing information, and to process changes in program pricing, promotions or other services and product promotions that the service provider or apartment or hotel owner may wish to provide their subscribers.

Relatively-low bandwidth cabling can be used for the last mile of the system 10, because each home run cable sent from the LSM 24 to the RIUs carries only a selected video channel, some OOB signals, forward and reverse DOCSIS channels, and communications between the communication unit 86 of the RIU and the microprocessor 56 of the LSM 24. For example, in communities where only 350 MHz or lower cabling runs out to each home, this system 10 could be installed. This is a great advantage over prior art video distribution systems in which high bandwidth cabling (e.g., bandwidth up to 750 MHz) to the home is typically required to allow for a broad selection of analog and video channels, as well as other features such as PVR, VOD, ITV, and so forth. This is because prior art systems pass all the channels out to the customer's home and rely on the set-top box to have sufficient capability to be able to tune/decode all of these channels, descramble/decrypt when appropriate, check to see if the customer is authorized, and so forth. The system 10 of the present invention, on the other hand, has tuner/IRDs at the local headend 20 which allow the system 10 to provide all the services of prior art systems without the need to pass all the channels out to the customer's home.

Furthermore, many if not all of the upgrades that are required for new and upgraded services offered by the cable provider can be made without requiring a cable representative to visit the customer's home. For example, when new video services are created which in prior art systems may require an upgrade to the digital STB, the present system 10 can be upgraded more economically at the local headend 20. Most upgrades can be made by modifying equipment in the local headend 20 or local service module 24. In this way, the customer with a digital STB or RIU will not see their equipment become out-of-date or obsolete. In turn, this should decrease the number of digital customers who terminate digital services due to frustrations such as this.

In addition, because of the tuner/IRDs at the local headend 20, it is possible for an analog customer to be allowed to sample (e.g., as part of a promotion) or regularly receive digital channels that are converted to analog at the local headend and passed through the LSM 24 to the customer's analog RIU 78. In addition, the analog customer can be allowed to sample services normally only provided to digital customers. So it can be appreciated that the customer can be offered different levels of service selected from possibilities such as analog only, digital converted to analog, digital only, or the ability to receive digital and analog signals. Of course, the last two levels mentioned above require a digital RIU 100.

Although this simple example provides for a community of single family homes with ten RIUs per LSM and three LSMs per signal combiner/diplexer at the local headend, it can be appreciated that this invention is scalable up or down across a broad range. In addition, this invention can be equally applied to multiple-dwelling units (MDUs), such as apartments, garden apartment complexes, hotels, assisted living centers, cluster housing, and the like. Furthermore, the number of tuner/IRDs in a tuner/IRD block is not required to be ten. In addition, the number of shared tuner/IRD blocks, or the number of tuner/IRDs in each shared tuner/IRD block is variable. In addition, some part of the CMS might be maintained or shared between a number of local headends, building structures, or complexes in close proximity if it increases functionality or reduces cost. In cases where the premium subscriber penetration increases within the area addressed by a group of LSM blocks, additional tuner/IRD cards or an additional tuner/IRD block may be inserted. Furthermore, it may be possible to reduce the minimum frequency separation between adjacent tuner/IRD channels to be 12 MHz rather than 18 MHz.

As can be appreciated, the video distribution system 10 of the present invention provides many advantages. The invention provides a system in which a simplified device (as compared to a conventional set-top box) may be provided at the customer's home. It should be understood, however, that many types of digital STB would also work as the digital RIU 100, if it were desired to do so. Furthermore, it may be desirable to mount the RIU internally in a wall rather than on top of a television, as is typical with a set-top box. As can be appreciated, more of the processing has been placed in upstream components such as the local service module and a headend. Since there are a greatly reduced number of these upstream components as compared to downstream components, increased cost savings are realized. In addition, these upstream components are designed to be standardized so that a large quantity of a small number of different components can be purchased rather than a smaller quantity of a large number of different components, as is the case with many other prior art designs. Also, since the LSM is not concerned with whether it is passing a video channel containing a digital multiplex or analog video and audio signals, certain upstream processing is simplified. Furthermore, a system has been provided in which cable piracy is not practical for the customer, either because no signal can be obtained, because the signal may be unusable, because the piracy may be easily detectible by the local service module, or because the customer may have no selection over the video channel received as a result of the piracy. Although only ten programmable converters are provided per local service module and only three local service modules are provided per signal combiner, these numbers are not fixed and only selected in this example to satisfy typical bandwidth constraints.

It can be appreciated that when a customer selects a channel that requires a tuner/IRD, that the tuner/IRD displays program information in a textual fashion for a given period of time (e.g., five seconds) and then the tuner/IRD no longer displays the program information. At this point, the customer can be switched over to a shared tuner/IRD if there is one already receiving/decoding this channel, freeing up the tuner/IRD in the tuner/IRD block of ten for other customers. The switch may be perceptible, but it will only be momentary. Various algorithms for switching between the dedicated and the shared tuner/IRD resources could be used, and they could depend on the type of community or application in which the system is implemented.

It can also be appreciated that another advantage of this system is that all communications downstream from the LSM 24 to the RIUs 26 are at approximately 300 MHz or below so that relatively less expensive cabling can be used. By way of contrast, the communications from video sources 14, 16, and 18 to the headend 20 and from the headend to the LSMs 24 may need cabling that allows for communication at up to 750 MHz.

Although reference has been made throughout this application to DOCSIS delivery, it is not the only means for providing data over cable. Any other suitable means would also work satisfactorily with the present invention. For example, if a T-1 line is available to the local headend 20, then a CMTS system could be employed and DOCSIS from the cable operator would not be necessary.

If Video Over Internet Protocol (VOIP) or other technologies using MPEG-4 encoding become more prevalent in the future, it should be appreciated that, by either sending these as DOCSIS forward channels or by sending these as 6 MHz wide digital multiplexes, the delivery of such future transmissions can be facilitated by the present invention without changing the RIUs or LSMs, but simply by making headend modifications. This clearly is a significant cost advantage to the service provider.

Another important advantage of the system is that with the LSM 24 and CMS 28 having appropriate intelligence, the CMS 28 can determine the usage of channels downstream on a time basis and reassign shared IRD assets. For example, if every day at 7 am in a particular building a majority of the people are watching CNN, HBO, Games, Discovery, ESPN, Weather, CNBC, CBS News, PBS, and ABC News, and at some other time (e.g., 9 pm) a majority are watching some other set of channels, the shared group of IRDs can be so assigned, thus allowing for the minimal number of IRDs needed in that application.

Another advantage is that the CMS 28 in its database can keep track of every selection a subscriber makes. This data can be made available or marketed as extremely valuable customer preference marketing information.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. For example, the above-described system includes one possible partitioning between software and hardware, but many others are possible, because of the flexibility of the design. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method comprising:
   receiving, at an input diplexer in a local service module located in a neighborhood, a multiplexed channel signal that includes an internet connectivity channel and at least one digital video channel and at least one analog video channel;
   separating by a divider module coupled to the input diplexer and included in the local service module, the internet connectivity channel from the multiplexed channel signal to output an internet connectivity channel signal;
   receiving by a request module, at the local service module, via a two-way communications path from at least one of a plurality of room interface units located within the neighborhood and serviced by the local service module, a request to transmit the at least one digital video channel or the at least one analog video channel;
   in response to the request, a plurality of conversion modules coupled to the divider module and the request module converting the at least one digital video channel or the at least one analog video channel from its frequency within the multiplexed channel signal to a signal having a predetermined frequency that corresponds to the at least one of the plurality of room interface units making the request;
   combining a plurality of combiner modules correspondingly coupled to the conversion modules and the divider module in the local service module, the internet connectivity channel signal and the converted signal having the predetermined frequency; and
   transmitting by the local service module, the combined signal to the at least one of the plurality of room interface units.

2. The method of claim 1 further comprising: the local service module passing the at least one digital video channel through a band pass filter with a narrow frequency band.

3. The method of claim 2, wherein the narrow frequency band is centered at the output of a programmable converter within the local service module.

4. The method of claim 1, wherein the at least one digital video channel is received from a Personal Video Recorder.

5. The method of claim 1, wherein the at least one digital video channel is received from a Video On Demand Server.

6. The method of claim 1, wherein the at least one digital video channel is received from a Personal Computer.

7. The method of claim 1, wherein the internet connectivity channel signal includes a DOCSIS forward channel carried from an Internet service provider to a customer and the method further comprises:
   the local service module converting the DOCSIS forward channel to a different frequency than the frequency of the DOCSIS forward channel within the multiplexed channel signal.

8. The method of claim 1 further comprising:
   receiving, by the local service module, via the two-way communications path from the at least one of the plurality of room interface units, information for selecting a certain channel.

9. The method of claim 8, wherein the information received from the at least one of the plurality of room interface units further includes a DOCSIS return channel for transmission to an Internet service provider.

10. The method of claim 8, wherein the information for selecting a certain channel includes information identifying a frequency corresponding to the certain channel within the multiplexed channel signal.

11. The method of claim 10 further comprising:
    the local service module tuning to the frequency corresponding to the certain channel within the multiplexed channel signal.

12. The method of claim 10 further comprising: the local service module converting the frequency corresponding to the certain channel within the multiplexed channel signal from a first frequency to a second frequency corresponding to the at least one of the plurality of room interface units.

13. The method of claim 1, wherein the at least one digital video channel includes MPEG-4 encoded information.

14. The method of claim 1, wherein the two-way communications path is a cable.

15. The method of claim 14, wherein the cable is a coaxial cable.

16. The method of claim 1, wherein the request to transmit the at least one digital video channel or at least one analog video channel takes the form of a signal received at the predetermined frequency.

17. The method of claim 1, wherein at least one digital video channel is converted from its frequency within the multiplexed channel signal to a predetermined frequency that corresponds to the at least one of the plurality of room interface units, the method further comprising:
    assembling by the local service module, the at least one digital video channel into a single frequency-multiplexed transmission signal.

18. The method of claim 1 further comprising filtering the multiplexed channel signal with a bandpass filter to allow substantially only a DOCSIS forward channel signal for the corresponding room interface unit to pass through.

19. The method of claim 1 further comprising receiving a DOCSIS return channel signal and providing a frequency-selectable return signal back to a cable modem transmission system (CMTS).

20. The method of claim 19 wherein the frequency-selectable return signal has a range of 10-45 Megahertz (MHz).

21. A system comprising:
    an input diplexer adapted to receive a multiplexed channel signal that includes an internet connectivity channel and at least one digital video channel and at least one analog video channel;
    a divider module coupled to the input diplexer to separate the internet connectivity channel from the multiplexed channel signal to output an internet connectivity channel signal and a plurality of signals having the at least one digital video channel and at least one analog video channel;
    a request module adapted to receive, via a two-way communications path from at least one of a plurality of room interface units proximally located in a neighborhood where the system is located, a request to transmit the at least one digital video channel or at least one analog video channel;

a plurality of conversion modules coupled to the divider module and the request module, and adapted to convert, in response to the request, the plurality of signals having the at least one digital video channel or the at least one analog video channel from its frequency within the multiplexed channel signal to a predetermined frequency of a corresponding one of the at least one of the plurality of room interface units; and a plurality of combiner modules correspondingly coupled to the conversion modules and the divider module, and adapted to combine the internet connectivity channel signal and one of the signals having the predetermined frequency, the combined signals to be transmitted from the combiner modules to respective ones of the at least one of the plurality of room interface units.

22. The system of claim 21 further comprising a plurality of band pass filters correspondingly coupled to the divider and the conversion modules, wherein each of the signals having the at least one digital video channel and the at least one analog video channel is passed through one of the plurality of band pass filters with a narrow frequency band.

23. The system of claim 22 wherein the narrow frequency band is centered at the output of a conversion module.

24. The system of claim 21 wherein the at least one digital video channel is received from a Personal Video Recorder.

25. The system of claim 21 wherein the at least one digital video channel is received from a Video On Demand Server.

26. The system of claim 21 wherein the at least one digital video channel is received from a Personal Computer.

27. The system of claim 21 wherein the internet connectivity channel is adapted to include a DOCSIS forward channel carried from an Internet service provider to a customer, and the system further comprises a DOCSIS channel filter coupled to the divider module, and adapted to convert the DOCSIS forward channel to a different frequency than the frequency of the DOCSIS forward channel within the multiplexed channel signal.

28. The system of claim 21 wherein the request received from the at least one of the plurality of room interface units further includes a DOCSIS return channel for transmission to an Internet service provider.

29. The system of claim 21 wherein the request to transmit the at least one digital video channel or at least one analog video channel includes information identifying a frequency corresponding to the certain channel within the multiplexed channel signal.

30. The system of claim 21 wherein the at least one digital video channel includes MPEG-4 encoded information.

31. The system of claim 21 further comprising:
a plurality of transmission modules correspondingly coupled to the combiner modules, and adapted to transmit correspondingly, via a two-way communications path, the at least one digital video channel or the at least one analog video channel at the predetermined frequency to the at least one of a plurality of room interface units; and
wherein the request to transmit the at least one digital video channel or at least one analog video channel is received via the two-way communications path.

32. The system of claim 31 wherein the two-way communications path is a cable.

33. The system of claim 32 wherein the cable is a coaxial cable.

34. The system of claim 21 wherein the request to transmit the at least one digital video channel or at least one analog video channel takes the form of a signal received at the predetermined frequency.

35. The system of claim 21 wherein the request module further comprises:
a processing module adapted to process the channel selection information to obtain the at least one digital video channel or at least one analog video channel from the multiplexed channel signal.

36. A system comprising:
input means for receiving a multiplexed channel signal that includes an internet connectivity channel and at least one digital video channel and at least one analog video channel;

divider means for separating the internet connectivity channel from the multiplexed channel signal to output an internet connectivity channel signal and a plurality of signals having the at least one digital video channel and at least one analog video channel;

request means for receiving, via a two-way communications path from at least one of a plurality of room interface units proximally located in a neighborhood where the system is located, a request to transmit the at least one digital video channel or at least one analog video channel;

conversion means for converting, in response to the request, the plurality of signals having the at least one digital video channel or the at least one analog video channel from its frequency within the multiplexed channel signal to a predetermined frequency of a corresponding one of the at least one of the plurality of room interface units; and combiner means for combining the internet connectivity channel signal and one of the signals having the predetermined frequency, the combined signals to be transmitted from combiner modules of the combiner means to respective ones of the at least one of the plurality of room interface units.

37. The system of claim 36 further comprising band pass filter means, wherein each of the signals having the at least one digital video channel and the at least one analog video channel is passed through the band pass filter means with a narrow frequency band.

38. The system of claim 36 wherein the internet connectivity channel includes a DOCSIS forward channel carried from an Internet service provider to a customer, and the system further comprises DOCSIS channel filter means for converting the DOCSIS forward channel to a different frequency than the frequency of the DOCSIS forward channel within the multiplexed channel signal.

* * * * *